D. MEEK.
WAGON BRAKE.
APPLICATION FILED SEPT. 16, 1909.

961,248.

Patented June 14, 1910.

Witnesses

Inventor
Don Meek.

By
Attorneys

UNITED STATES PATENT OFFICE.

DON MEEK, OF PAONIA, COLORADO.

WAGON-BRAKE.

961,248.  Specification of Letters Patent. Patented June 14, 1910.

Application filed September 16, 1909. Serial No. 518,047.

*To all whom it may concern:*

Be it known that I, DON MEEK, a citizen of the United States, residing at Paonia, in the county of Delta and State of Colorado, have invented a new and useful Wagon-Brake, of which the following is a specification.

The objects of the invention are, generally, the provision in a merchantable form, of a device of the above-mentioned class, which shall be inexpensive to manufacture, facile in operation, and devoid of complicated parts; specifically, the provision of a vehicle brake, the shoes of which are adapted first to be drawn into contact with the wheel, and subsequently, to ride downwardly upon the periphery of the wheel, increasing the hold of the brake shoes thereon, novel means being provided for setting and for releasing the brake shoes, the component parts of the device co-acting to form a brake of unusual efficiency; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

Figure 1:
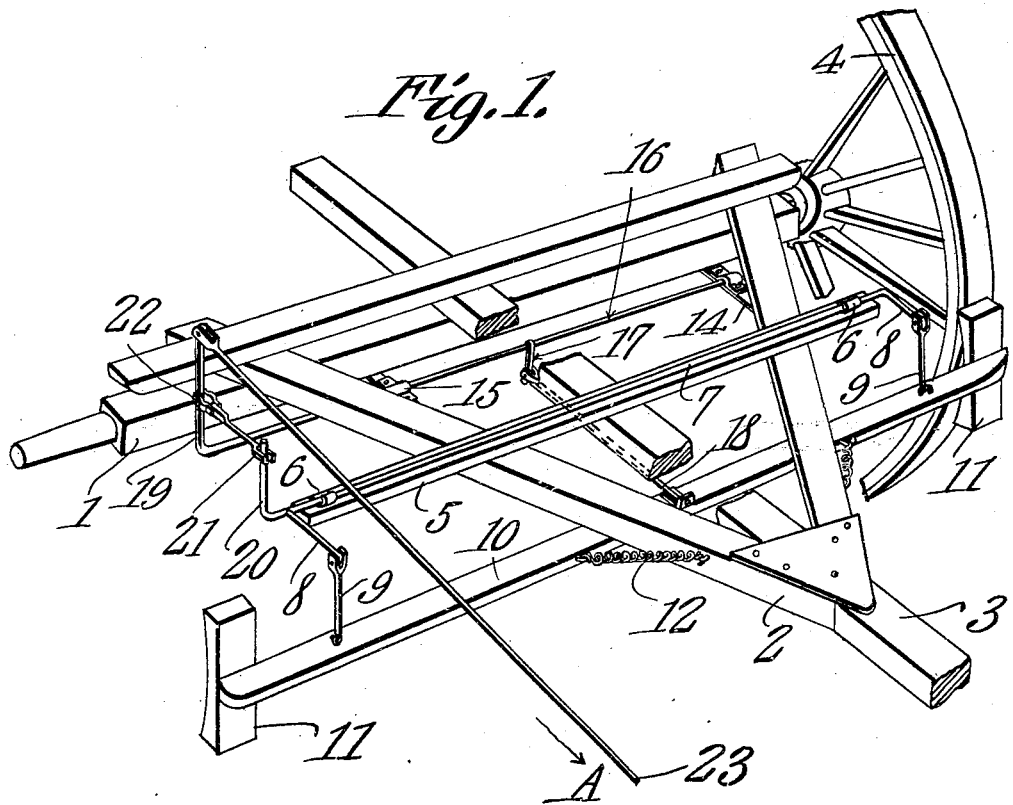
Figure 2:
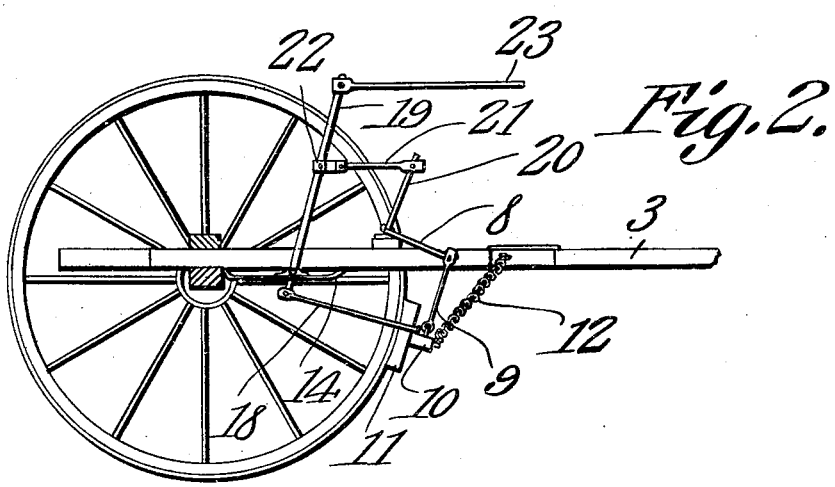

In the accompanying drawings, Figure 1 shows my invention in perspective; and Fig. 2 is a side elevation thereof.

In the drawings I have shown a portion of the frame of a vehicle, the same comprising the rear axle 1, the hounds 2 and the reach 3, one of the rear wheels 4 of the vehicle being shown in part.

In carrying out my invention, I mount transversely upon the hounds 2, a crossbeam 5, carrying bearings 6, in which is mounted the forward rock shaft 7, provided with forwardly extending arms 8, located adjacent the ends of the shaft. Pivotally connected with the forward end of the arms 8, are hangers 9, supporting a brake-beam 10, provided with brake shoes 11, adapted to bear against the rear wheels 4 of the vehicle.

Retractile springs 12 are connected at their forward end with the hounds 2, and at their rearward end with the brakebeam 10, upon either side of the reach 3, the springs 12 serving at once to raise the brakebeam 10, and to draw the same away from the wheels 4. Supports 14 extend longitudinally of the frame, being connected at their forward end with the hounds 2, and at their rearward end, with the rear axle 1. These supports 14 carry bearings 15 in which is mounted a transversely disposed rear rock shaft 16, provided in its intermediate portion, with a depending arm 17, there being a rigid connection 18 connected at one end with the arm 17, and at the other end secured to the brakebeam 10. The rock shafts 7 and 16 are provided, respectively, at their adjacent ends, with upstanding arms 20 and 19, these arms 20 and 19 being united by a foldable connection, comprising a bar 21, one end of which is pivotally connected with the arm 20, the other end thereof being disposed, between the forward ends of spaced plates 22, the rear ends of which are disposed upon opposite sides of the arm 19 and pivotally connected therewith. Assembled with the upper extremity of the arm 19 is a draw-rod 23, and it is to be understood that this rod 23, at its forward end, may be connected with the ordinary brake-lever, or with any other common and well-known means whereby vehicle brakes are operated.

The operation of the device is as follows:—It is to be noted that the brakebeam 10 is normally supported and held away from the periphery of the wheels 4, by means of the retractile springs 12. When, therefore, the rod 23 is moved in the direction of the arrow A the upper end of the arm 19 will move forwardly, the lower end of the arm 17 moving rearwardly, and, through the medium of the connection 18, drawing the brakebeam 10 rearwardly, to cause the shoes 11 to contact with the wheels 4. While this operation is taking place, the rock shaft 7 will remain inoperative, for the reason that the bars 21 and the plates 22 form a foldable connection between the arms 19 and 20, the springs 12 preventing the brakebeam 10 from dropping, when the members 21 and 22 are thus folded. After the brake shoes 11 have thus been brought into contact with the wheels 4, the shoes 11 will ride downwardly upon the peripheries of the wheels, tilting the rock shaft 7 and drawing the members 21 and 22 into alinement, as shown in Fig. 2. The axis of rotation of the brake shoes 11 is, substantially, the axis of the rock shaft 16, and since the axis of the rock shaft 16 and the axis of the wheels 4 are not identical, it is obvious that, as the brake shoes 11 move downwardly with the periphery of the wheels the grip of the brake shoes upon the wheels will be increased. As the brake shoes 11 thus move downwardly, the rock shaft 16 will be operated, the connection 18 binding the shoes 11 firmly against the peripheries of the wheels, the initial pull upon the rod 23 being maintained during the operation. When the forward pull upon the rod 23 ceases, the springs 12 will raise the brakebeam 10, and draw the shoes 11 away from the wheels.

Having thus described my invention, what I claim as new and desire to protect by Letters Patent is:—

1. The combination with the frame and wheels of a vehicle, of forward and rearward rock shafts carried by the frame and provided with upstanding arms; a brake beam suspended from the forward rock shaft and arranged to be lowered thereby; resilient means for raising the brake beam and for holding the same away from the wheels; means connecting the rear rock shaft with the brake beam to draw the latter into contact with the wheels when the former is rocked; a foldable connection between the arms of the shafts; and means for rocking the rear shaft.

2. The combination with the frame and wheels of a vehicle, of forward and rearward rock shafts carried by the frame, each provided with upstanding arms, the rear shaft having a depending arm and the forward shaft having forwardly extending arms; a brake beam suspended from the forwardly extending arms; a connection between the depending arm and the brake beam; a foldable connection between the upstanding arms; a draw rod connected with the upstanding arm of the rear shaft; and resilient means for raising the brake beam and for holding the same away from the wheel.

In testimony that I claim the foregoing as my own, I have hereto affixed my signature in the presence of two witnesses.

DON MEEK.

Witnesses:
C. C. HAWKINS,
JOSEPH MEEK.